Aug. 30, 1966  O. C. EMMONS  3,269,049
FISHING APPARATUS

Filed Sept. 30, 1964  3 Sheets-Sheet 1

INVENTOR.
OTTIE C. EMMONS
BY
Dunlap & Janey
ATTORNEYS

Aug. 30, 1966 — O. C. EMMONS — 3,269,049
FISHING APPARATUS
Filed Sept. 30, 1964 — 3 Sheets-Sheet 2

INVENTOR.
OTTIE C. EMMONS
BY Dunlap & Laney
ATTORNEYS

Aug. 30, 1966    O. C. EMMONS    3,269,049
FISHING APPARATUS
Filed Sept. 30, 1964    3 Sheets-Sheet 3
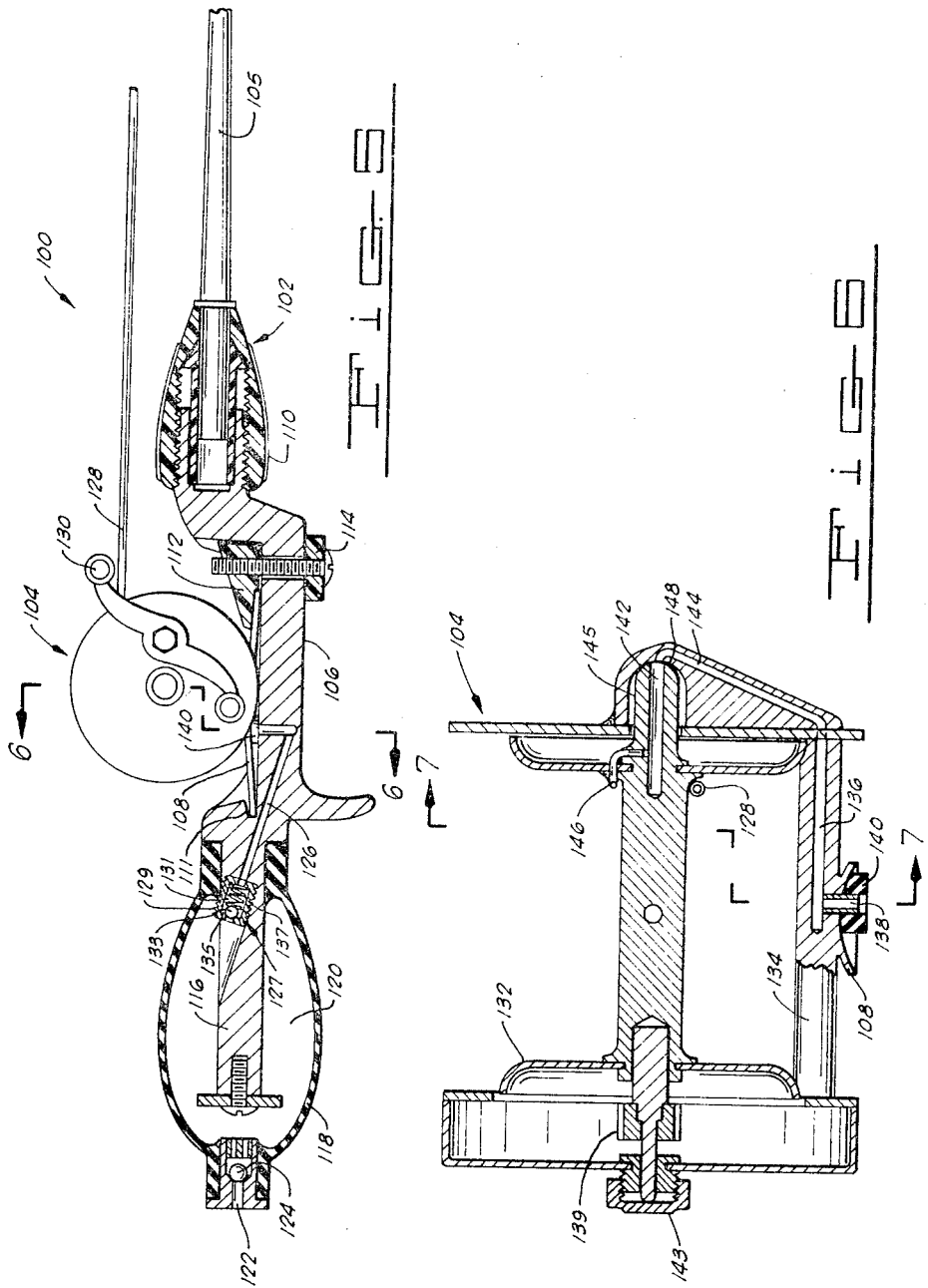
INVENTOR.
OTTIE C. EMMONS
BY
Dunlap & Laney
ATTORNEYS United States Patent Office 3,269,049
Patented August 30, 1966

3,269,049
FISHING APPARATUS
Ottie C. Emmons, % Granot Lodge, 730 S. 10th St.,
Clinton, Okla.
Filed Sept. 30, 1964, Ser. No. 400,403
9 Claims. (Cl. 43—23)

This invention relates generally to improved fishing apparatus. More particularly, but not by way of limitation, this invention relates to improved fishing apparatus that can be utilized to create air bubbles in the vicinity of fish lure.

Various types of fishing apparatus have been constructed in the past for the purpose of either causing air or gas bubbles to occur in the vicinity of the fish lure or to generate a gas which is utilized to impart a motion to artifical lures for the purpose of attracting the attention of fish. United States Patent No. 2,796,605 issued to I. R. Ashley on June 18, 1957, discloses fishing apparatus utilizing a hollow fish line which is supported by a fishing pole. One end of the hollow fishing line is connected with an inflatable lure. The other end of the hollow fish line is connected with an air bulb. When the air bulb is squeezed, air is transmitted through the hollow fish line into the inflatable lure resulting in a movement of the lure to attract fish.

A fishing lure utilizing a chemical agent for generating gas bubbles is disclosed in United States Patent No. 2,594,387, issued April 29, 1952, to W. R. H. Breuer. The lure disclosed therein is attached to an ordinary fishing line and has a hollow interior for containing an effervescent chemical. A passageway extends from the hollow interior of the lure through a hollow hook. As the chemical effervesces, gas bubbles pass through the passageway in the hollow hook causing the lure to move from side to side and simultaneously emits a stream of gas bubbles.

While both of the aforedescribed lures work very well, they do have some limitations which should be pointed out. For example, the device disclosed in the Ashley patent will be limited to use in areas where relatively short fishlines can be utilized, that is, where the fish lure can be lowered into the water at a point no further away from the fisherman than the length of the pole being used. Due to the limited size of fish lures, the chemical generating lure can contain only a small amount of chemical and therefore the period of time during which they will operate is further limited. Also, a supply of chemical must be carried by the fisherman so that the lure can be recharged as it dissipates.

Broadly, this invention provides improved fishing apparatus utilizing a hollow fishline having a lure attached to one end thereof. The opposite end of the fishline is connected to a reel which is mounted on a fishing rod. The fishing rod supports the fishline in the usual manner and is provided with a variable volume chamber which is connected by means of a passageway with the interior of the hollow fishline. The arrangement is such that decreasing the volume of the chamber will cause air to pass therefrom through the passageway in the reel and through the hollow fishline to the vicinity of the lure where it is emitted in the form of bubbles. The emission of the air from the end of the line also imparts motion to the lure, thus providing both bubbles and lure movement for attracting fish.

One object of the invention is to provide an improved fishing apparatus that can be used to create bubbles in the vicinity of a lure.

Another object of the invention is to provide an improved fishing apparatus that can be used to produce movement of a lure.

A further object of the invention is to provide an improved fishing apparatus that can be used to produce both air bubbles and movement of the lure.

Still another object of the invention is to provide an improve fishing apparatus that can be used to cast a lure to a location relatively remote from the fisherman and to create bubbles near the lure.

One other object of the invention is to provide an improved fishing apparatus that can be used to produce bubbles near and cause movement of the lure and, yet, does not require the use of chemical gas generators.

A still further object of the invention is to provide an improved fishing apparatus that can be used to cast any lure and produce bubbles in the vicinity of the lure.

The foregoing and additional objects and advantages of the invention will become more apparent as the following description is read in conjunction with the accompanying drawing wherein like reference characters denote like parts in all views and wherein:

FIG. 5 is a view, partly in cross-section and partly in elevation, of another embodiment of fishing apparatus also constructed in accordance with the invention;

FIG. 6 is a cross-sectional view of the embodiment of FIG. 5, taken substantially along the line 6—6 of FIG. 5;

Figure 1:
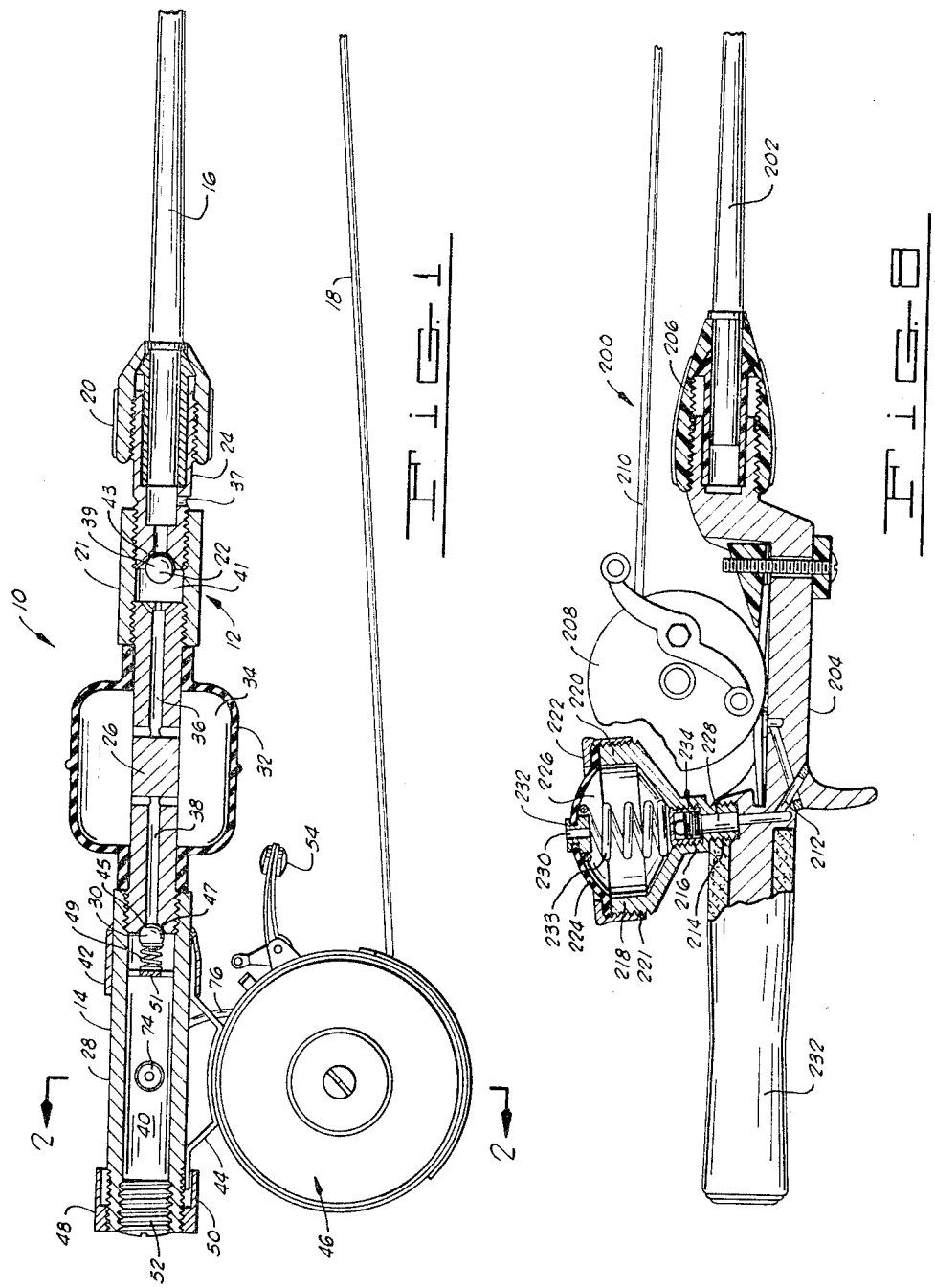
FIG. 1 is a view, partly in elevation and partly in cross section, illustrating one embodiment of fishing apparatus constructed in accordance with the invention.

Referring now to the drawing and to FIGS. 1 through 4 in particular, shown therein and generally designated by the reference character 10 is one embodiment of fishing apparatus constructed in accordance with the invention. The apparatus 10 includes a fishing rod 12 which includes a handle 14 and a rod 16. The rod 16 is an elongated member which includes one or more eyes (not shown) for supporting a fishline 18. The elongated rod 16 is connected in end to end relationship with the handle 14 by a threaded connecting member or collet 20.

The handle 14 is comprised of the forward section 21, which accommodates a one-way or check valve 22 and is threadedly connected with an adapter 24 which has its opposite end threaded for connection with the connecting member 20; a central or gripping portion 26, which is threadedly connected at one end with the forward portion 21; and a tubular reel supporting portion 28, which is connected with the gripping portion 26 and carries a second one-way or check valve 30.

An annular member 32 encircles the central portion 26 forming a chamber 34 therewith. The annular member 32 is constructed from a resilient and elastic material so that the volume of the chamber 34 may be decreased by deforming the annular member 32.

A first passageway 36 extends from the chamber 34 forwardly through the central portion 26 and the forward portion 21. The forward end of the passageway 36 is exposed to the atmosphere by the leakage of air past the rod 16 and connecting member 20. One or more ports 37, which extend from the passageway 36 through the adapter 24, may be provided if desired. The check valve 22 includes a ball member 39 which is movably located in a ball chamber 41 in the section 21. The ball member 39 is sized to sealingly engage a seat 43 formed by the adapter 24 thereby preventing air movement from the chamber 34 through the passageway 36 and out the ports 37. The passageway 36 adjacent the ball chamber 41 is divided into a plurality of smaller passageways so that the ball member 39 cannot prevent flow through the passageway 36 into the chamber 34. Stated in another way, the check valve 22 is positioned in the passageway 36 in such a manner that it permits air to flow into the chamber 34 but prevents the flow of air therethrough in the opposite direction.

A second passageway 38 extends rearwardly from the chamber 34 through the central portion 26 into the interior 40 of the reel supporting portion 28. The second check valve 30 is disposed in the passageway 38 and is arranged to permit the flow of air from the chamber 34 into the interior 40, but to prevent the flow of air therethrough in the opposite direction. As illustrated, the valve ball 45 of the check valve 30 is biased against an annular seat 47 by a compression spring 49. The opposite end of the spring 49 is in engagement with a ported plate 51 which is rigidly mounted in the portion 28.

An annular sleeve 42 is fixed to the portion 28 and is arranged to receive one portion of the supporting bracket 44 of a fishline reel 46. A second sleeve 48 is threadedly engaged with the portion 28 and is provided with an axial flange 50 which engages another portion of the supporting bracket 44 to releasably retain the reel 46 on the handle 14. The rear-most end of the portion 28 is closed by a plug 52.

Figures 2, 3:
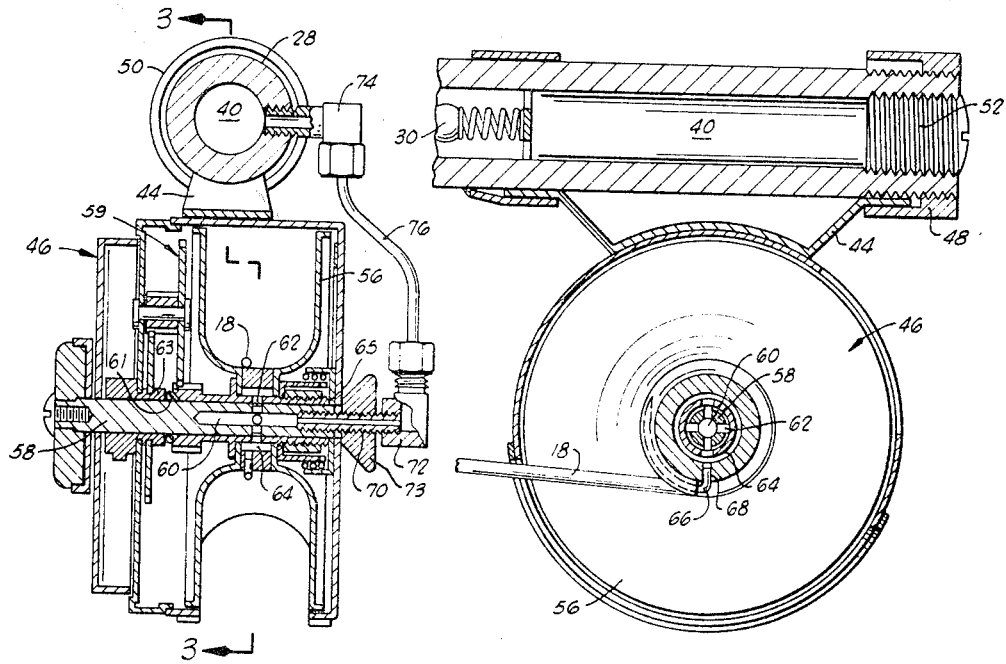
FIG. 2 is a cross-sectional view of the fishing apparatus of FIG. 1, taken along the line 2—2 of FIG. 1.
FIG. 3 is a cross-sectional view of the fishing apparatus of FIG. 1, taken along the line 3—3 of FIG. 2.

It should be pointed out that the fishing apparatus 10 conforms to the general configuration used for fly-casting. The reel 46 is of the conventional automatic rewind type and includes a spring (not shown) which provides power for rewinding the fishline 18 when the trigger mechanism 54 is actuated. As illustrated in FIGS. 2 and 3, a fishline spool 56 is rotatably mounted on a fixed shaft 58 which extends through the reel 46. The spool 56 is driven by the spring (not shown) through a plurality of gears comprising a gear train which is generally designated by the reference character 59.

The reel 46 is modified by forming an axial passageway 60 in the shaft 58. The passageway 60 is connected, by a plurality of ports 62 extending through the wall of the shaft 58, with a small annular chamber 64 which is defined by the interior of the fishline spool 56 and the exterior of the shaft 58. A resilient seat 61, which may be an O-ring, encircles the shaft 58 between a gear hub 63 thereon and the countersunk end of the spool 56 to prevent leakage of fluid thereby from the ports 62. The opposite end 65 of the spool 56 engages the housing of the reel 46 to prevent leakage of air from the ports 62.

A short curved conduit 66 is positioned in a port 68, which extends through the spool 56, placing the conduit 66 in communication with the chamber 64. The conduit 66 is sized to be inserted within the interior of the tubular fishline 18 thereby connecting the fishline 18 with the axial passageway 60.

As shown most clearly in FIG. 2, a threaded nipple 70 has one end extending into the passageway 60 through one side of the reel 46 and has its opposite end connected with a right angle fitting 72. A threaded nut 73 is provided to urge the shaft 58 to the right, as shown in FIG. 2, deforming the seal 61 and forcing the spool end 65 into sealing engagement with the reel 46. A second right angle fitting 74 extends through the portion 28 of the handle 14 providing communication with the interior 40 thereof. The fittings 72 and 74 are interconnected by means of a short conduit 76.

Figures 4, 7:
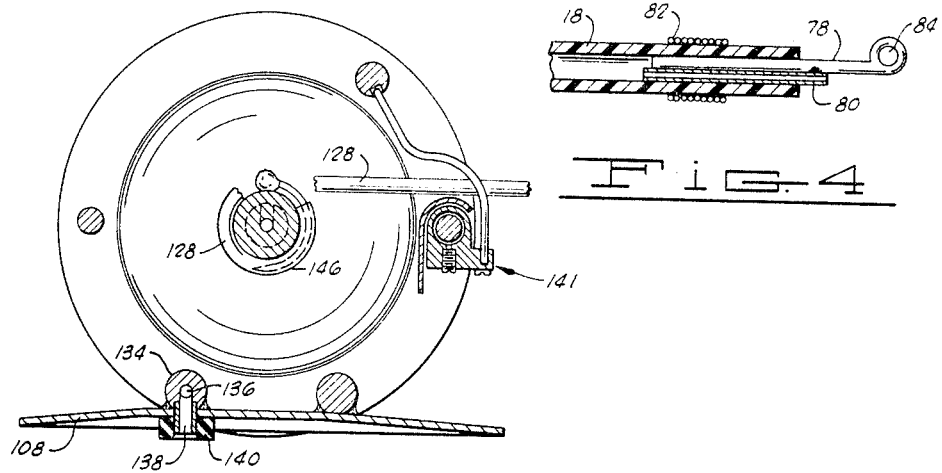
FIG. 4 is an enlarged view, partly in elevation and partly in cross-section, illustrating the attachment of a lure connecting member to a tubular fishline.
FIG. 7 is a cross-sectional view of the embodiment of FIG. 5 taken substantially along the line 7—7 of FIG. 6; and, FIG. 8 is a view, partly in elevation and partly in cross-section, of another embodiment of fishing apparatus also constructed in accordance with the invention.

As shown in FIG. 4, the free end of the tubular fishline 18 has a lure connecting member 78 attached thereto. To assure the free passage of air from the interior of the tubular fishline 18, a short section of conduit 80 is preferably soldered to the connecting member 78 and extends therewith into the tubular fishline 18. One end of the conduit 80 projects from the free end of the fishline 18. After the connecting member 78 and the attached conduit 80 are inserted in the tubular fishline 18 a plurality of wraps of nylon cord 82 are taken about the fishline 18, the connecting member 78, and the conduit 80 to assure that the connecting member 78 is securely retained therein.

A lure (not shown) is then attached to an eyelet 84 on the free end of the connecting member 78 and the apparatus 10 is ready for use. The term "lure" as used herein is intended to be generic in the sense that it is to include, for example, a hook and leader with live, dead, or artificial bait on the hook, flys, and plugs of various sizes and shapes.

*Operation of the embodiment of FIG. 1*

Assuming that the chamber 34 is filled with air and a lure (not shown) is attached to the free end of the tubular fishline 18, the apparatus 10 is used in the same manner as any ordinary fly-fishing rod and reel. The lure is cast by the fisherman into the water. The fisherman then deforms the annular member 32 by squeezing, thereby reducing the volume of the chamber 34. Air from the chamber 34 passes through the passageway 38 past the check valve 30 into the interior 40 of the portion 28 of the handle 14. The air then enters the conduit 76 and passes into the passageway 60 of the shaft 58 of the reel 46. From the passageway 60, the air flows through the ports 62 into the annular chamber 64 and then through the port 68 into the conduit 66 which is inserted in the interior of the tubular fishline 18. Air entering the fishline 18 forces air from the interior thereof through the small conduit 80 and out into the water in the vicinity of the lure (not shown). As the air flows from the conduit 80, it will bubble upwardly through the water.

After the annular member 32 has been deformed driving the air outwardly through the passageway 38, the release of the annular member 32 permits it to return to its original shape creating a relatively low pressure area in the chamber 34 due to the closure of the check valve 30. As the low pressure area is formed air is drawn in through the passageway 36 past the check valve 22 to substantially fill the annular chamber 34. As soon as the annular chamber 34 is filled with air, the foregoing procedure may be repeated providing the desired bubbling action.

If the resilient member 32 is squeezed rapidly the air will leave the conduit 80 at a rather high velocity and, due to the resistance of the water to the air, the lure (not shown) will be caused to move a small amount in the water. If it is desired to impart a jerky motion to the lure as well as creating bubbles, the annular member 32 will be squeezed and released in rapid succession.

Referring now to FIGS. 5, 6 and 7, shown therein and generally designated by the reference character 100 is another embodiment of fishing apparatus also constructed in accordance with the invention. The apparatus 100 includes a fishing rod assembly 102 having a fishline reel 104 mounted thereon.

The rod assembly 102 includes an elongated rod 105 and a handle 106 which is connected to the rod 105 in end to end relationship by means of a threaded connector or collet 110. The reel 104 is mounted on the handle 106 by inserting one portion of a mounting bracket 108 into a recess 111 provided in the handle 106. The other portion of the mounting bracket 108 is positioned under a releaseable clamp 112. The clamp 112 is drawn tightly into engagement with the mounting bracket 108 by means of a threaded screw 114 which extends through the handle 106.

The handle 106 also includes a gripping portion 116 of reduced diameter located to the rear of the reel 104. The portion 116 is substantially encased by a bulbar member 118 which cooperates with the portion 116 to form a variable volume chamber 120. The bulbar portion 118 is constructed from a resilient and elastic material and is provided with a port or passageway 122 in the rearmost portion thereof.

A check valve 124 is disposed in the port or passageway 122 and is arranged to permit air to flow through the passageway 122 into the chamber 120 but to prevent the flow therethrough in the opposite direction. A passageway 126 extends through the handle 106 having one end disposed in communication with the chamber 120 and having the other end disposed immediately beneath the reel 104 as will be described more fully hereinafter.

The end of the passageway 126 adjacent the chamber 120 is enlarged and threaded to receive a check valve 127. The check valve 127 includes a threaded body 129 having a ball chamber 131 formed therein. A valve ball 133 is movably located in the ball chamber 131 and is biased toward a seat 135 by a spring 137. The ball 133 is sized to sealingly engage the seat 135 to prevent flow from the passageway 126 into the chamber 120 and to permit flow from the chamber 120 into the passageway 126.

The reel 104 is of the type generally used for bait or plug casting and has a tubular fishline 128 wound thereon. A handle 130, shown in FIG. 5, is utilized for winding the fishline 128 on the reel 104.

The reel 104 also includes a rotatable drum or spool 132 upon which the tubular fishline 128 is wound. A gear train connects the handle 130 with the spool 132 (only the gear 139 is shown in FIG. 6) and with a level winding device 141 (see FIG. 7). A friction brake 143 of conventional construction is illustrated in FIG. 6. A cross member 134, which is integral with the mounting bracket 108 of the reel 104, has a passageway 136 formed therein.

As illustrated most clearly in FIGS. 6 and 7, a short vertical passageway 138, which extends from the passageway 136 through a resilient gasket 140, is aligned with one end of the passageway 126 when the reel 104 is mounted on the rod handle 106. The gasket 140 is provided to prevent leakage of air from the connection between the passageways 126 and 138. A passageway 142 is drilled into the end of the hub 145 of the spool 132 and is in communication with the passageway 136 by means of a passageway 144 extending through the reel 104. The spool 132 is provided with a short curved section of conduit 146 which has one end in communication with the passageway 142 and has the other end sized to be inserted in the tubular fishline 128 as illustrated most clearly in FIG. 7. A seal is formed at 148 between the end of the hub 145 surrounding the passageway 142 and the reel 104 to prevent the leakage of air as it flows from the passageway 144 into the passageway 142.

The free end of the tubular fishline 128 will be provided with a lure connecting member and conduit as illustrated in FIG. 4 and as described in connection with the embodiment of FIG. 1.

*Operation of the embodiment of FIG. 5*

With a lure (not shown) attached to the tubular fishline 128, the fisherman will cast the lure into the water as desired. After the lure has entered the water, the bulbar member 118 will be squeezed, thereby reducing the volume in the chamber 120 and driving all or a portion of the air therefrom through the passageway 126 through the check valve 127 into the passageways 136, 144 and 142 in the reel 104. The air will pass from the passageway 142 through the conduit 146 into the tubular fishline 128. As described in connection with the embodiment of FIG. 1, air from the tubular fishline 128 will pass through the conduit 80 creating bubbles in the vicinity of the lure (not shown) and/or causing movement of the lure.

When the bulbar member 118 is squeezed, the check valve 124 moves to a position closing the passageway 122 thereby preventing air from passing from the chamber 120 and directing the air therein through the check valve 127 into the passageway 126. When the bulbar portion 118 is released and returns to its normal position, the check valve 127 closes and a relatively low pressure area is created in the chamber 120, drawing air through the passageway 122 past the check valve 124 and substantially filling the chamber 120.

Referring to FIG. 8, shown therein and generally designated by the reference character 200 is another embodiment of a fishing apparatus also constructed in accordance with the invention. The fishing apparatus 200 includes an elongated rod 202 attached in an end-to-end relationship with a rod handle 204 by a threaded connector or collet 206. A reel 208, which is identical in all respects with the reel 104 as described in connection with FIG. 5, is mounted on the handle 204 in the same manner as the reel 104 was mounted on the handle 106 of the embodiment of FIG. 5. A tubular fishline 210 is wound on the reel 208 and has its other end provided with a lure connecting member and conduit as described in connection with FIG. 4.

The rod handle 204 is provided with a passageway 212 which extends from the reel 208 rearwardly and upwardly through the exterior of the handle. The upper end of the passageway 212 is counterbored and threaded as shown at 214 to receive the threaded lower end 216 of a chamber forming member 218. The upper end 220 of the chamber forming member 218 is considerably larger than the end 216 and is threaded on its exterior surface 221 to receive a diaphragm retaining member 222. A diaphragm 224, which has a convex exterior surface, covers the entire upper open end 220 of the chamber forming member 218 cooperating therewith to define a chamber 226. The lower end 216 of the chamber forming member 218 is provided with a passageway 228 which is in communication with the passageway 212 in the rod handle 204. A port 230 extends through an eyelet 232 which is mounted in the diaphragm 224. A compression type spring 233 is disposed in the chamber 226 between the diaphragm 224 and the lower end 216 of the chamber forming member 218. The spring 233 may be omitted if the diaphragm 224 has sufficient resiliency to return to its original configuration.

A check valve 234 is mounted in an enlarged portion of the passageway 228. The check valve 234 is identical to the check valve 127 described in connection with the embodiment of FIG. 5 and serves the same purpose, i.e., air can pass through the valve 234 from the chamber 226 into the passageways 212 and 228, but cannot pass therethrough in the opposite direction.

The chamber forming member 218 and the diaphragm retaining member 222 are formed from a rather rigid material, which is preferably resistant to corrosion, such as aluminum. The diaphagm 224 is constructed from a resilient and elastic material.

A generally cylindrical grasping portion 232 extends rearwardly providing a member by which the fisherman can grasp the rod handle 204.

*Operation of the embodiment of FIG. 8*

With a lure (not shown) attached to the tubular fishline 210, the fisherman will grasp the handle portion 232 and cast the lure into the water as desired. When the lure is in the water, and it is desired to either produce bubbles near the lure or to cause movement of the lure, the fisherman will place his thumb over the port 230 in the diaphragm 224 and depress the diaphragm 224 which decreases the area in the chamber 226, driving air through the check valve 234 and passageway 228 into the passageway 212 in the handle 204. Air passes from the passageway 212 through the reel 208 and tubular fishline 210 as described in connection with the embodiment of FIG. 5.

To refill the chamber 226 with air, the fisherman removes his thumb from the diaphragm 224 uncovering the port 230. The check valve 234 closes and the diaphragm 224 resumes its initial convex shape, either due to the urging of the spring 233 or due to the resiliency of the diaphragm 224, causing a reduction in pressure in the chamber 226. Air will then flow through the port 230 substantially filling the chamber 226.

From the foregoing detailed description it can be appreciated that the invention set forth herein provides a novel structure which can be utilized to produce bubbles and/or movement of a lure used in connection with the casting apparatus which includes a fishline reel and rod. Furthermore, the term "casting rod" as used herein refers to any type of fishing rod normally used in connection with a fishing reel.

It should be understood that the foregoing embodiments are presented by way of example only and that many changes and modifications can be made thereto without departing from the spirit of the invention or from the scope of the annexed claims.

What I claim is:

1. Fishing apparatus including a tubular fishline having means for connecting a lure attached thereto for transmitting air to the vicinity of the lure, said apparatus comprising:
   a fishline reel having a passageway therein in communication with said tubular fishline; and,
   a casting rod having an elongated portion arranged to support the fishline and a handle portion arranged to support said reel, said handle portion including means forming a variable volume chamber therein, and having a passageway providing communication between said chamber and the passageway in said reel.

2. Fishing apparatus including a tubular fishline having means for connecting a lure attached thereto for transmitting air to the vicinity of the lure, said apparatus comprising:
   a fishline reel having a passageway therein in communication with said tubular fishline; and,
   a casting rod including an elongated member and a handle member connected in end to end relationship with said elongated member, said handle including means for retaining said reel thereon, means forming a variable volume chamber therein, and having a passageway providing communication between said chamber and the passageway in said reel.

3. The apparatus of claim 2 and also including one-way valve means operably located in a port extending through said chamber forming means, said valve being arranged to permit fluid flow through said port into said chamber and to prevent flow therethrough in the opposite direction.

4. The apparatus of claim 2 wherein said chamber forming means is partially constructed of a resilient and elastic material.

5. The apparatus of claim 4 wherein the resilient portion of said chamber forming means has a port extending therethrough, said port being positioned whereby closure of said port and deformation of said resilient portion expels fluid from said chamber, through said reel, and into said tubular fishline.

6. The apparatus of claim 3 wherein said chamber forming means is partially constructed of a resilient and elastic material whereby deformation of said resilient portion closes said valve means and expels fluid from said chamber, through said reel, and into said fishline.

7. Fishing apparatus including a tubular fishline having means for connecting a lure attached thereto for transmitting air to the vicinity of the lure, said apparatus comprising:
   a fishline reel connected with the fishline and having a passageway therein in communication with said fishline; and,
   a casting rod including an elongated member arranged to support a portion of said fishline, a handle member connected with said elongated member, said handle member including
      means for retaining said reel thereon,
      a resilient elongated bulbar portion thereon forming a variable volume chamber and having a port therein,
      one-way valve means in the port in said bulbar portion arranged to permit air flow therethrough into said chamber and to prevent flow in the opposite direction, and
      a passageway therein connecting said chamber with the passageway in said reel whereby deforming said bulbar portion to reduce the volume of said chamber displaces the air in said chamber through said passageways and tubular fishline.

8. Fishing apparatus including a tubular fishline having means for connecting a lure attached thereto for transmitting air to the vicinity of the lure, said apparatus comprising:
   a fishline reel connected with the fishline and having a passageway therein in communication with said fishline; and,
   a casting rod including an elongated member arranged to support a portion of said fishline, a handle member connected with said elongated member, said handle member including
      means for retaining said reel thereon,
      a resilient annular portion encircling said handle member between said reel and elongated member and forming a variable volume chamber therewith,
      first and second passageways in said handle member connected with said chamber,
      means connecting said first passageway with the passageway in said reel,
      a first one-way valve means disposed in the first passageway arranged to permit the flow of air from said chamber into said reel and to prevent flow in the opposite direction, and
      a second one-way valve means operably disposed in said second passageway arranged to permit air to flow therethrough into said chamber and to prevent flow in the opposite direction.

9. Fishing apparatus including a tubular fishline having means for connecting a lure attached thereto for transmitting air to the vicinity of the lure, said apparatus comprising:
   a fishline reel connected with the fishline and having a passageway therein in communication with said fishline; and
   a casting rod including an elongated member arranged to support a portion of said fishline, a handle member connected with said elongated member, said handle member including means for retaining said reel thereon, and a passageway therein connected with the passageway in said reel; and means forming a variable volume chamber including
- a hollow body portion mounted on said handle member and having a closed lower end and an enlarged open upper end,
- a resilient diaphragm covering the open end of said body portion, said diaphragm having a port extending therethrough, and
- a passageway extending through said closed lower end connecting said chamber and the passageway in said handle member.

References Cited by the Examiner

UNITED STATES PATENTS

| | | | |
|---|---|---|---|
| 2,408,306 | 9/1946 | Flournoy | 43—57 |
| 2,583,660 | 1/1952 | Moore | 43—44.99 |
| 2,796,605 | 6/1957 | Ashley | 43—26.2 |

SAMUEL KOREN, *Primary Examiner.*

W. H. CAMP, *Assistant Examiner.*